United States Patent
Campbell

(10) Patent No.: US 8,189,917 B2
(45) Date of Patent: May 29, 2012

(54) METHODS AND SYSTEMS FOR LOCATING TEXT IN A DIGITAL IMAGE

(75) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 651 days.

(21) Appl. No.: 12/238,375

(22) Filed: Sep. 25, 2008

(65) Prior Publication Data

US 2010/0074526 A1 Mar. 25, 2010

(51) Int. Cl.
*G06K 9/34* (2006.01)

(52) U.S. Cl. .................................. 382/173; 382/176

(58) Field of Classification Search .............. 382/164, 382/173, 176, 189–190, 268; 358/1.9, 2.1, 358/3.15, 518, 522
See application file for complete search history.

(56) References Cited

U.S. PATENT DOCUMENTS

| | | | |
|---|---|---|---|
| 4,642,683 A * | 2/1987 | Alkofer .................. 358/522 |
| 5,566,255 A | 10/1996 | Pavlidis |
| 5,649,025 A | 7/1997 | Revankar |
| 5,699,454 A | 12/1997 | Nakai et al. |
| 5,768,441 A | 6/1998 | Yoshizawa et al. |
| 5,781,658 A | 7/1998 | O'Gorman |
| 5,852,678 A | 12/1998 | Shiau et al. |
| 5,920,655 A | 7/1999 | Makita et al. |
| 5,956,468 A | 9/1999 | Ancin |
| 6,295,371 B1 | 9/2001 | Rucklidge et al. |
| 6,333,788 B1 | 12/2001 | Yamada et al. |
| 6,731,800 B1 | 5/2004 | Barthel et al. |
| 6,853,755 B2 | 2/2005 | Li |
| 6,859,204 B2 | 2/2005 | Curry et al. |
| 6,973,213 B2 | 12/2005 | Fan et al. |
| 6,993,185 B2 | 1/2006 | Guo et al. |
| 7,062,099 B2 | 6/2006 | Li et al. |
| 7,079,687 B2 | 7/2006 | Guleryuz |
| 7,082,219 B2 | 7/2006 | Bourbakis et al. |
| 7,298,897 B1 | 11/2007 | Dominguez et al. |
| 7,411,699 B2 * | 8/2008 | Lee ............................... 358/1.9 |
| 7,437,002 B2 | 10/2008 | Tanaka |
| 2005/0047660 A1 | 3/2005 | Tanaka |
| 2005/0226503 A1 | 10/2005 | Bailey et al. |
| 2007/0150803 A1 | 6/2007 | Ahmed et al. |

FOREIGN PATENT DOCUMENTS

| | | |
|---|---|---|
| JP | 05-176180 A | 7/1993 |
| JP | 09-018702 A | 1/1997 |
| JP | 2002-312775 A | 10/2002 |

OTHER PUBLICATIONS

Japanese Office Action—Patent Application No. 2009-217821—Mailing Date Jan. 11, 2011.

* cited by examiner

*Primary Examiner* — Duy M Dang

(74) *Attorney, Agent, or Firm* — Kristine Elizabeth Matthews; David C. Ripma

(57) ABSTRACT

Aspects of the present invention are related to systems and methods for locating text in a digital image.

20 Claims, 4 Drawing Sheets

METHODS AND SYSTEMS FOR LOCATING TEXT IN A DIGITAL IMAGE

FIELD OF THE INVENTION

Embodiments of the present invention relate to the field of image analysis, and more particularly, to locating text characters in a digital image.

BACKGROUND

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text segmentation when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content. Additionally, text detection may be performed prior to optical character recognition (OCR) and other image analysis tasks.

SUMMARY

Some embodiments of the present invention comprise methods and systems for locating text characters in an image. Some embodiments of the present invention may comprise dividing a multilevel image into a plurality of blocks and classifying each block as a text block or a non-text block based on one or more parameters associated with the block. In some embodiments of the present invention, a binarization threshold for each block may be determined. In some embodiments of the present invention, a contrast measure for each block may be determined. In some embodiments of the present invention, a bimodality measure for each block may be determined. In some embodiments of the present invention, a measure of the number of pixels within a block with image values greater than the binarization threshold associated with the block may be determined for each block.

In some embodiments of the present invention, a binary text map corresponding to a block may be produced according to the binarization threshold associated with the block.

In some embodiments of the present invention, a binary text map corresponding to a block may be produced according to a binarization threshold associated with blocks in a region proximate to the block for which the binary text map is being produced.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 3:
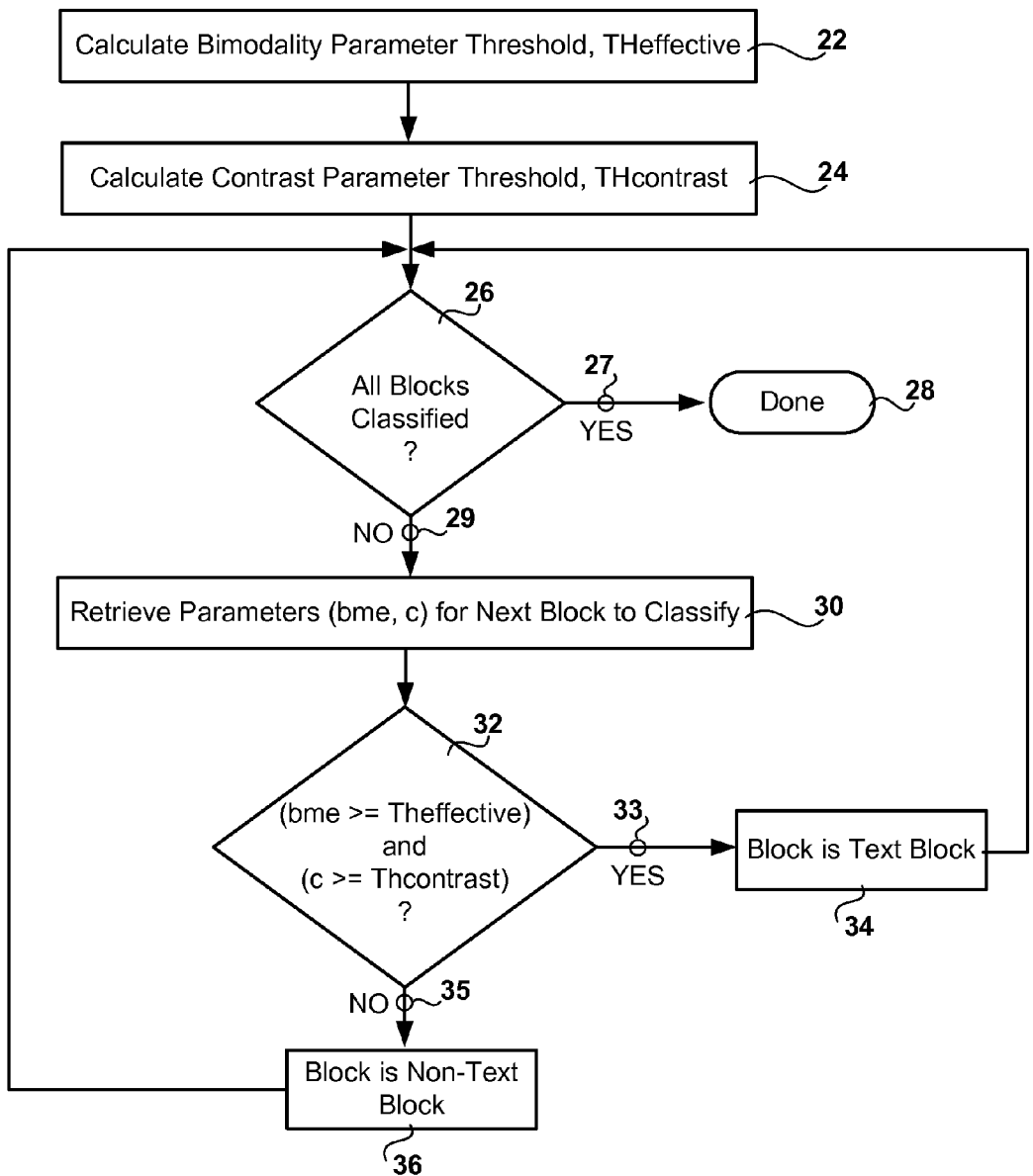
Figure 4:
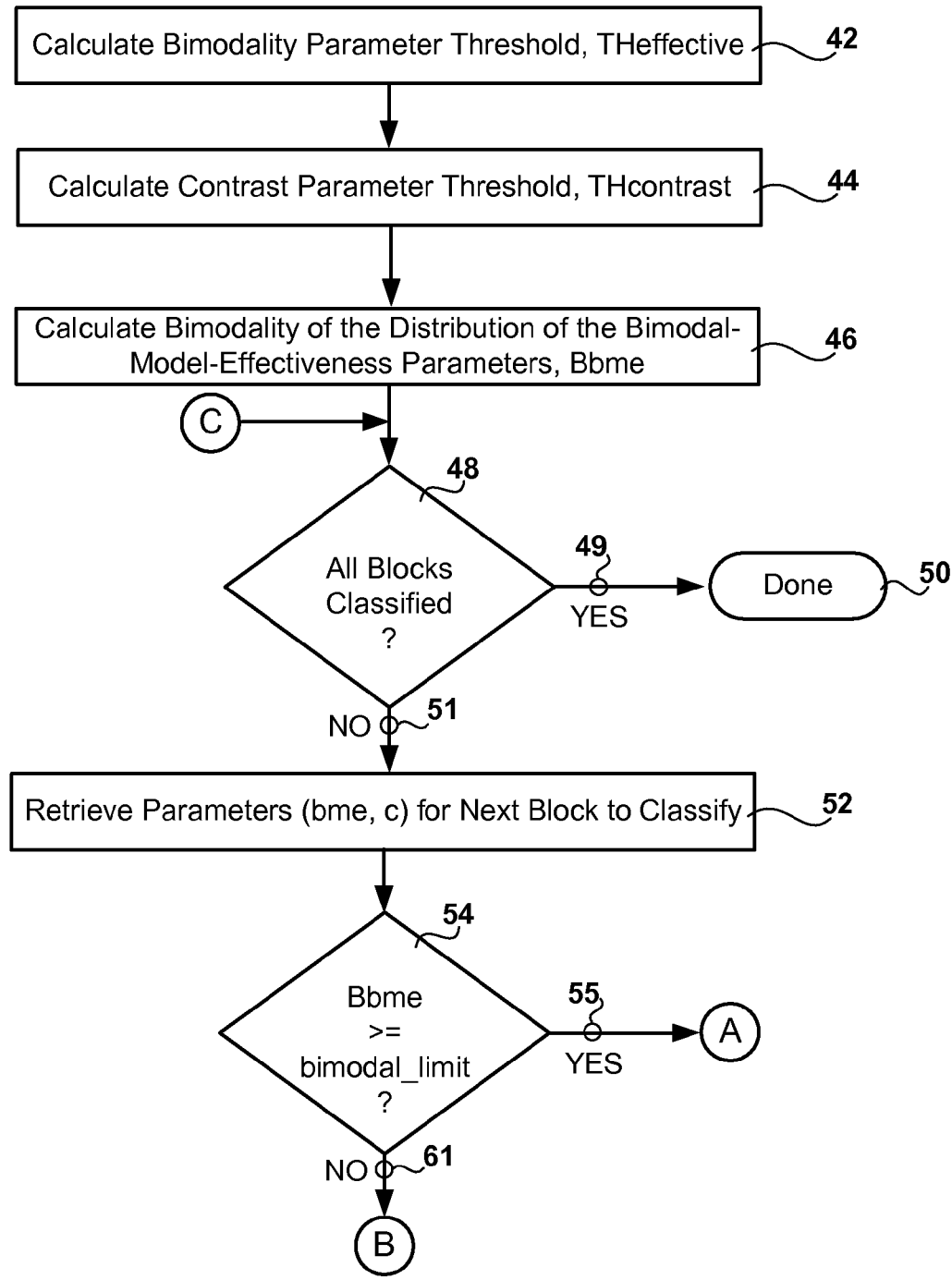
Figure 4:
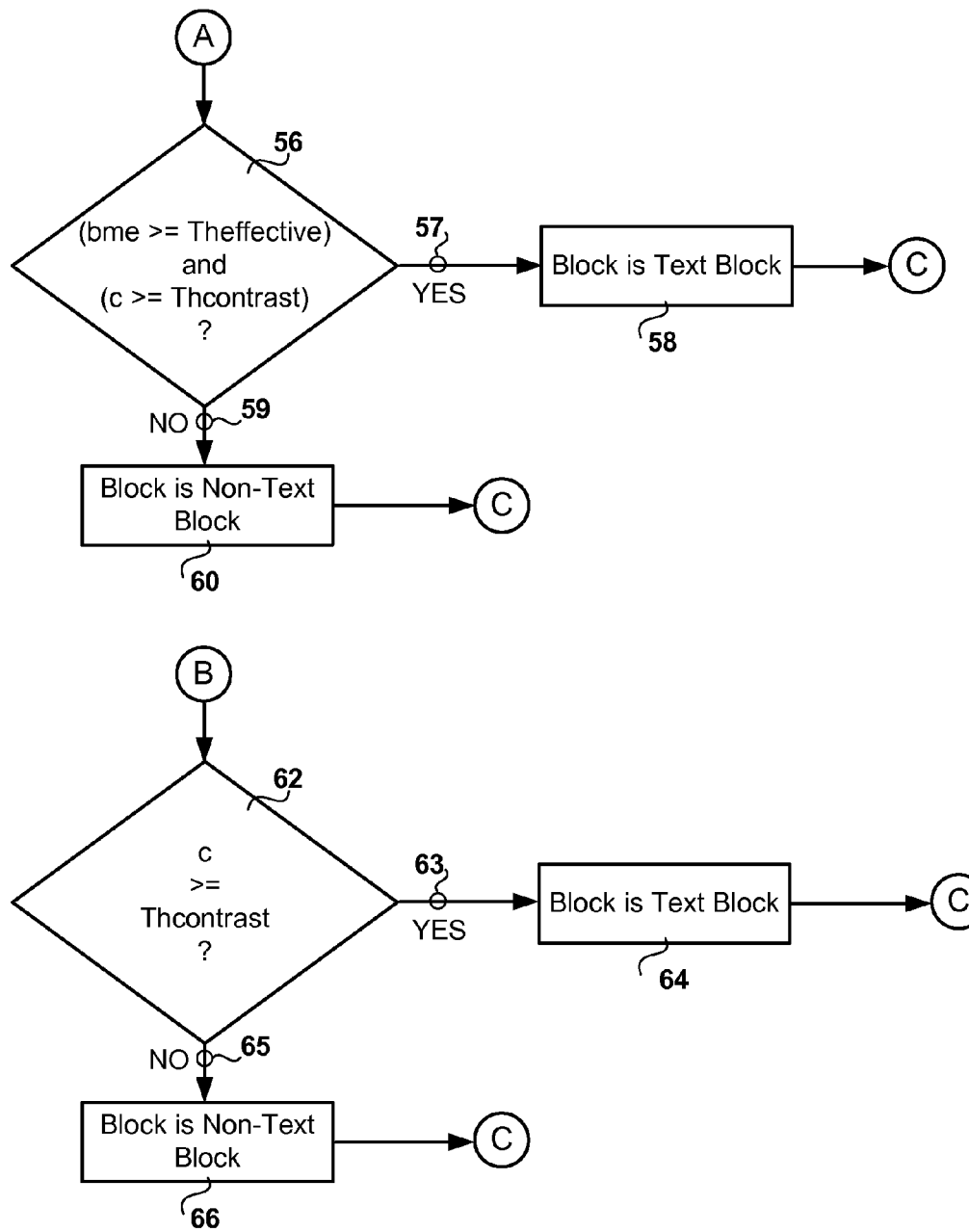

FIG. 3 is a chart showing exemplary embodiments of the present invention comprising classifying a block as a text block or a non-text block based on a contrast parameter and a bimodality parameter associated with the block; and FIG. 4 is a chart showing exemplary embodiments of the present invention comprising disregarding a block bimodality parameter in text-block classification when the distribution of block bimodality parameters is not effectively modeled by a bimodal model.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware, embedded firmware and/or software. Elements of embodiments of the present invention may be embodied as a server application and/or a resident application. Elements of the present invention may be embodied in an Objective Database Abstraction Layer (ODAL) framework. Elements of embodiments of the present invention may be embodied as part of a special purpose application-specific integrated circuit (ASIC). While exemplary embodiments revealed herein may only describe one of these forms, it is to be understood that one skilled in the art would be able to effectuate these elements in any of these forms while resting within the scope of the present invention.

The content of a digital image may have considerable impact on the compression of the digital image, both in terms of compression efficiency and compression artifacts. Pictorial regions in an image may not be efficiently compressed using compression algorithms designed for the compression of text. Similarly, text images may not be efficiently compressed using compression algorithms that are designed and optimized for pictorial content. Not only may compression efficiency be affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers, scanners and other imaging devices may use text detection when performing content-specific processing and compression on document, and other digital, images. Exemplary content-specific processing may comprise differential filtering and color enhancement. Exemplary content-specific compression may comprise layered compression schemes, where the contents of a document image are segmented into a high-resolution foreground layer and a lower resolution background.

Figure 1:
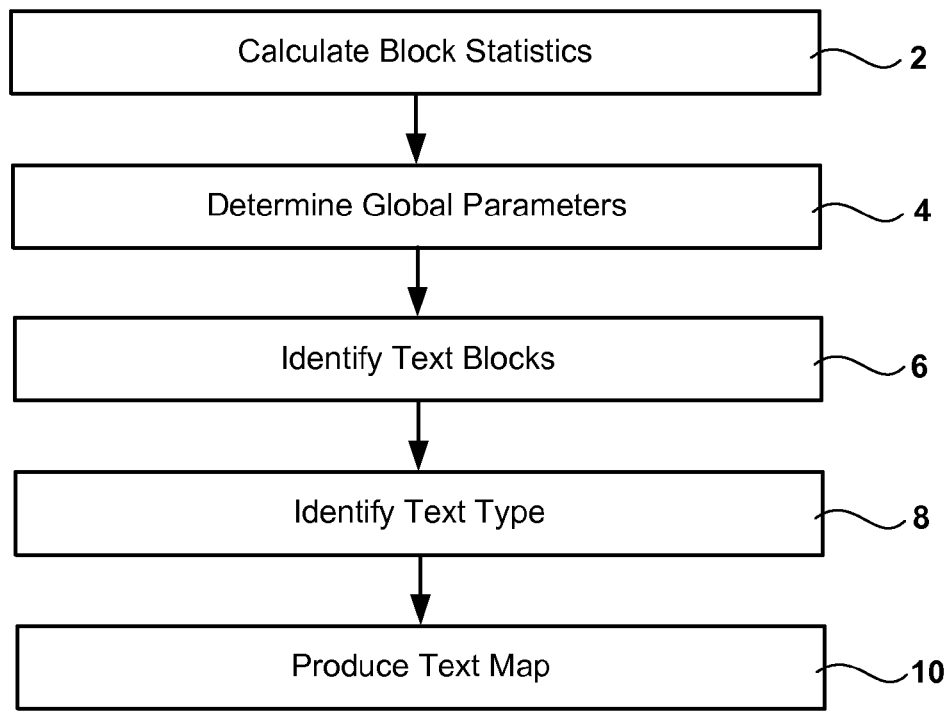
FIG. 1 is a chart showing exemplary embodiments of the present invention comprising calculation of global parameters based on block statistics and classifying blocks as text blocks based on the global parameters.

Detection of text in digital images may be used so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content. Additionally, text detection may be performed prior to optical character recognition (OCR) and other image analysis tasks In some embodiments of the present invention, a binary text map may be produced, wherein one binary value may be associated with text characters in a digital image, and the other binary value may be associated with non-text elements in the digital image. Binarization may refer to producing binary output. Some of these embodiments of the present invention may be described in relation to FIG. 1. Block statistics may be calculated 2 for a multilevel digital image. Global parameters may be determined 4 from the block statistics, and blocks that likely contain text may be determined 6. If a block contains text, whether the text is normal text or reverse text may be ascertained 8. The blocks may then be binarized 10 to produce a text map.

Figure 2:
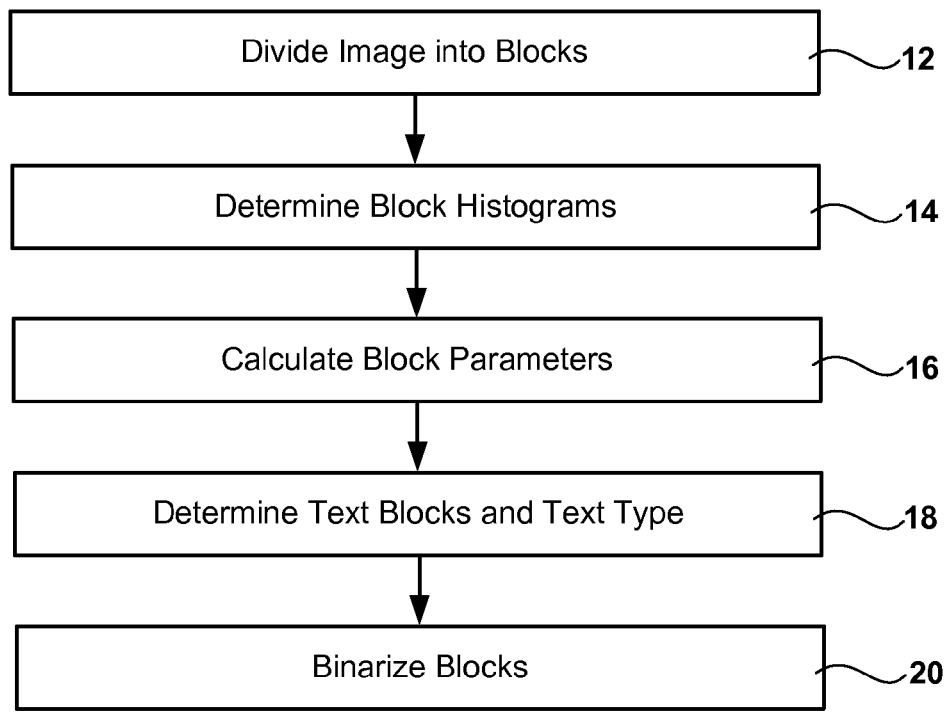
FIG. 2 is a chart showing exemplary embodiments of the present invention comprising calculating parameters associated with a block based on the block histogram.

Some embodiments of the present invention may be understood in relation to FIG. 2. A multilevel image may be divided 12 into blocks. The image values for a block may be accumulated 14 into a block histogram associated with the block, and block parameters may be calculated 16 from the block histogram and the block image data. In some embodiments of the present invention, a block histogram may be formed 14 and block parameters may be calculated 16 for each block in the image. In alternative embodiments, blocks may be pre-processed and block histograms may be formed 14 and block parameters may be calculated 16 for select blocks in the image.

In some embodiments of the present invention, an image value may comprise a color value in a color space. Exemplary color spaces include RGB, sRGB, CMYK, YCbCr, YUV, Lab and other color spaces known in the art. In alternative embodiments of the present invention, an image value may comprise a gray-scale value.

In some embodiments of the present invention, the block histogram associated with an image block may be used to determine a one or more of parameters associated with the block. One exemplary parameter may be a binarization threshold. The binarization threshold for a block may be denoted block (i, j).th, where i and j index the block. Another exemplary parameter may be related to the effectiveness of a bimodal model for the distribution described by the block histogram. This parameter may be referred to as the block bimodal-model-effectiveness parameter, or the block bimodality parameter, and it may be denoted block (i, j).η(th) for the block indexed by i and j. The block bimodality parameter may depend on the block binarization threshold. Yet another exemplary parameter may be the block contrast, which may be denoted block (i, j).c. Another exemplary block parameter may be the percentage of multilevel values in the block above the binarization threshold. The percentage of multilevel values in the block above the binarization threshold for the block may be denoted block (i, j).no. In some embodiments of the present invention, all four of the above-listed exemplary parameters may be calculated. The parameters may be used to determine 18 if a block contains text and the text type, and the binarization threshold may be used to classify 20 the elements in a text block as text or non-text.

In some embodiments of the present invention, Otsu's threshold may be calculated for an image block using the block histogram. Otsu's threshold is the threshold that minimized the within-class variance, which may be denoted $\sigma_{Within}^2$, and conversely maximizes the between-class variance, which may be denoted $\sigma_{Between}^2$, for a bimodal classifier. Thus, for a multilevel image comprising N levels, an optimum threshold may be determined for a block by maximizing the between-class variance for the block. This may be denoted by:

$$\sigma_{Between}^2(th) = \max_{0 \le k \le N-1} \sigma_{Between}^2(k),$$

where th corresponds to the multilevel image value k that maximizes $\sigma_{Between}^2(k)$. In some embodiments of the present invention, the threshold, th, for a block may be determined according to a sequential search. In alternative embodiments of the present invention, the threshold, th, for a block may be determined according to update formulas, as described in the following, for $\sigma_{Between}^2(k+1)$.

The between-class variance for a block for a given threshold k may be written as:

$$\sigma_{Between}^2(k) = n_{below}(k) n_{above}(k) [\mu_{below}(k) - \mu_{above}(k)]^2,$$

where $n_{below}(k)$ and $n_{above}(k)$ are the number of pixels within the block that are below the threshold and above the threshold, respectively, and $\mu_{below}(k)$ and $\mu_{above}(k)$, are the mean values of the cluster of pixels below the threshold and above the threshold, respectively. Thus if $n_k$ is the number of pixels that change classes when the threshold is moved from k to k+1, then:

$$n_{below}(k+1) = n_{below}(k) + n_k$$

$$n_{above}(k+1) = n_{above}(k) - n_k$$

$$\mu_{below}(k+1) = \frac{\mu_{below}(k) n_{below}(k) + n_k k}{n_{below}(k+1)}$$

$$\mu_{above}(k+1) = \frac{\mu_{above}(k) n_{above}(k) - n_k k}{n_{above}(k+1)}$$

and $n_k$ is the count of the kth histogram bin, and the between-class variance may be updated using the above recurrence relations. Thus the binarization threshold associated with a block may be given by the Otsu's threshold for the block.

In alternative embodiments of the present invention, alternative threshold calculations well-known in the art may be used to determine the binarization threshold associated with a block.

In some embodiments of the present invention, a measure of the effectiveness of the bimodal model for a block may be calculated according to:

$$\eta(th) = \frac{\sigma^2_{Between}(th)}{\sigma^2_{Total}},$$

where $\sigma^2_{Total}$ is the total variance of the block. This bimodal-model-effectiveness measure may be referred to as the bimodality of the block.

In some embodiments of the present invention, the block contrast may be determined from the block histogram. The block contrast may be determined according to:

$$c = \max_{0 \le k \le N-1}(h \cdot bins[k] \ne 0) - \min_{0 \le k \le N-1}(h \cdot bins[k] \ne 0),$$

where h.bins[k] is the count of the histogram bin corresponding to level k. In alternative embodiments, the contrast may be determined for a block by directly searching the multilevel image data within the block.

In some embodiments of the present invention, the percentage of pixels in a block above the optimum threshold determined for the block may be determined according to:

$$no = 1 - cdf[th],$$

where cdf[·] denotes the discrete cumulative density function associated with the block. The cumulative density function may be determined according to:

$$cdf[th] = \frac{h \cdot bins[th]}{blockcount} + cdf[th-1],$$

where h.bins[th] is the count of the histogram bin corresponding to the threshold and blockcount is the total number of pixels in the block.

In some embodiments of the present invention, whether or not a block contains text may be determined based on the contrast parameter and the bimodality parameter associated with the block. In these embodiments, blocks with highly bimodal distributions and strong contrast may be labeled blocks containing text, also considered text blocks. The bimodality of a text block may depend of the source of the multi-level image data. For example, in an ideal case of one-color text on a one-color background obtained through an ideal acquisition system, simple text regions may yield a perfectly bimodal distribution, wherein one image data value is associated with the font color and another image data value is associated with the background color value. However, distributions of simple text regions may deviate from perfect bimodality due to the impact of the optical characteristics and discrete sampling during digitization and due to print technology distortions of the strokes during the original printing of a scanned document. In addition, the uniformity of a text font color may vary spatially. For example, print engines that print text using halftone techniques and multiple colors may produce documents that when scanned will generate lower bimodality scores than other technologies such as those wherein text is produced using electro photographic print engines and a single toner color. Similarly, text contrast may depend on the source of the multilevel data.

In some embodiments of the present invention, the distribution of the block contrast parameters and the block bimodality parameters may be examined to classify text blocks and non-text blocks. Some of these embodiments of the present invention may be described in relation to FIG. 3. A bimodality-parameter threshold, denoted $th_\eta$, (shown as THeffective in FIG. 3), which separates the block bimodality parameters into two clusters may be calculated 22. A contrast-parameter threshold, denoted $th_c$ (shown as THcontrast in FIG. 3), which separates the block contrast parameters into two clusters may be calculated 24. The calculations of the two thresholds are independent calculations, and calculation of these thresholds may be performed in parallel or serially. The bimodality-parameter threshold may be used to separate blocks based on the value of a block's bimodality parameter, and the contrast-parameter threshold may be used to separate blocks based on the value of a block's contrast parameter. In some embodiments of the present invention, the bimodality-parameter threshold may be Otsu's threshold for the block bimodality parameter values, and the contrast-parameter threshold may be Otsu's threshold for the block contrast parameter values. In alternative embodiments, the bimodality-parameter threshold or the contrast-parameter threshold may be determined according to other methods known in the art. In alternative embodiments of the present invention, the bimodality-parameter threshold may be set to a predetermined lower bound if Otsu's threshold for the bimodality parameter is below a predetermined lower bound. In some embodiments of the present invention, the predetermined value lower bound may be 0.7.

It may be then determined 26 if there are remaining blocks of the input image to classify. If all blocks have been classified 27, then the classification is complete 28. If there are remaining blocks to classify 29, then the bimodality parameter and the contrast parameter for the next block may be retrieved 30. The parameter values may be compared 32 to their respective threshold values, and if the parameter values are 33 each greater than or equal to their respective threshold, then the block may be classified as a text block 34. If the parameter values are not 35 each greater than or equal to their respective threshold, then the block may be classified as a non-text block 36. After classification, it may be determined 26 if all blocks are classified. In alternative embodiments of the present invention, the block parameter values may each be strictly greater than their respective threshold to yield classification of the block as a text block.

In some embodiments of the present invention, the classification of a block as text or non-text may be according to:

$$block(i,j) \cdot text = \begin{cases} 1, & (block(i,j) \cdot \eta(th) \ge th_\eta) \text{ AND } (block(i,j) \cdot c \ge th_c) \\ 0, & \text{otherwise,} \end{cases}$$

where "1" indicates classification of block (i, j) as a text block, "0" indicates classification of block (i, j) as a non-text block, block (i, j).η(th) is the bimodal-model-effectiveness parameter, also considered the bimodality parameter, for block (i, j) and block (i, j).c is the contrast parameter for block (i, j).

In alternative embodiments of the present invention, the classification of a block as text or non-text may be according to:

$$block(i,j) \cdot text = \begin{cases} 1, & (block(i,j) \cdot \eta(th) > th_\eta) \text{ AND } (block(i,j) \cdot c > th_c) \\ 0, & \text{otherwise,} \end{cases}$$

where "1" indicates classification of block (i, j) as a text block, "0" indicates classification of block (i, j) as a non-text block, block (i, j).η(th) is the bimodal-model-effectiveness parameter, also considered the bimodality parameter, for block (i, j) and block (i, j).c is the contrast parameter for block (i, j).

In alternative embodiments of the present invention described in relation to FIG. 4, when the bimodality of the distribution of the block bimodality parameters falls below a limit, then the bimodal-model-effectiveness of the block may not be used to classify the block.

A bimodality-parameter threshold, which may be denoted $th_\eta$, (shown as THeffective in FIG. 4), which separates the block bimodality parameters into two clusters may be calculated 42. A contrast-parameter threshold, which may be denoted $th_c$ (shown as THcontrast in FIG. 4), which separates the block contrast parameters into two clusters may be calculated 44. Calculation of these two thresholds are independent calculations, and the two threshold calculations may be performed in parallel or serially. The bimodality-parameter threshold may be used to separate blocks based on the value of a block's bimodality parameter, and the contrast-parameter threshold may be used to separate blocks based on the value of a block's contrast parameter. In some embodiments of the present invention, the bimodality-parameter threshold may be Otsu's threshold for the bimodality parameter values, and the contrast-parameter threshold may be Otsu's threshold for the contrast parameter values. In alternative embodiments, the thresholds may be calculated according to other methods known in the art. In alternative embodiments of the present invention, the bimodality-parameter threshold may be set to a predetermined lower bound if Otsu's threshold for the bimodality parameters is below the lower bound. In some embodiments of the present invention, the predetermined value lower bound may be 0.7. In addition to determining 42, 44 the two optimal thresholds, the bimodal-model-effectiveness for the distribution of the block bimodality parameters may be calculated 46 (shown as Bbme in FIG. 4).

It may be then determined 48 if there are remaining blocks of the input image to classify. If all blocks have been classified 49, then the classification is complete 50. If there are remaining blocks to classify 51, then the bimodality parameter and the contrast parameter for the next block may be retrieved 52. The bimodality of the distribution of the bimodal-model-effectiveness parameters may be compared 54 to a predetermined limit, and if the bimodality of the distribution of the bimodal-model-effectiveness parameters is greater than or equal to the limit 55, then the parameter values may be compared 56 to their respective threshold values, and if the parameter values are 57 each greater than or equal to their respective threshold, then the block may be classified as a text block 58. If the parameter values are not 59 each greater than or equal to their respective threshold, then the block may be classified as a non-text block 60. After classification, it may be determined 48 if all blocks are classified.

If the bimodality of the distribution of the bimodal-model-effectiveness parameters is not greater than or equal to the limit 61, then the block contrast parameter value may be compared 62 to the threshold associated with contrast, and if the comparison indicates that the block contrast parameter value is greater than or equal to 63 the contrast-parameter threshold, then the block may be classified as a text block 64. If the contrast parameter value is not greater than or equal 65 to the contrast-parameter threshold, then the block may be classified as a non-text block 66. After classification, it may be determined 48 if all blocks are classified. In alternative embodiments of the present invention, the block parameter values may each be strictly greater than their respective threshold to yield classification of the block as a text block.

In some embodiments of the present invention, the classification of a block as text or non-text may be according to:

$$\text{block}(i, j) \cdot \text{text} = \begin{cases} 1, & (C1 \text{ AND } C2 \text{ AND } C3) \text{ OR } (C2 \text{ AND } C3') \\ 0, & \text{otherwise,} \end{cases}$$

where:

$C1 = (\text{block}(i, j).\eta(th) \geq th_\eta)$, $C2 = (\text{block}(i, j).c \geq th_c)$, $C3 = (\eta(th_\eta) \geq th_{bimodal})$, "1" indicates classification of block (i, j) as a text block, "0" indicates classification of block (i, j) as a non-text block, block (i, j).η(th) is the bimodal-model-effectiveness parameter for block (i, j), block (i, j).c is the contrast parameter for block (i, j), $\eta(th_\eta)$ is the bimodality of the distribution of the bimodal-model-effectiveness parameters and $th_{bimodal}$ is a predetermined limit.

In alternative embodiments of the present invention, the classification of a block as text or non-text may be according to:

$$\text{block}(i, j) \cdot \text{text} = \begin{cases} 1, & (C1 \text{ AND } C2 \text{ AND } C3) \text{ OR } (C2 \text{ AND } C3') \\ 0, & \text{otherwise,} \end{cases}$$

where:

$C1 = (\text{block}(i, j).\eta(th) > th_{72})$, $C2 = (\text{block}(i, j).c > th_c)$, $C3 = (\eta(th_\eta) > th_{bimodal})$, "1" indicates classification of block (i, j) as a text block, "0" indicates classification of block (i, j) as a non-text block, block (i, j).η(th) is the bimodal-model-effectiveness parameter for block (i, j), block (i, j).c is the contrast parameter for block (i, j), $\eta(th_{72})$ is the bimodality of the distribution of the bimodal-model-effectiveness parameters and $th_{bimodal}$ is a predetermined limit.

In some embodiments of the present invention, text blocks may be further classified for the type of text. Normal text may refer to text regions where the luminance value of the text font color is darker than that of the background color. One example of normal text is black-colored text on a white-colored background. Reverse text may refer to text regions where the luminance value of the text font color is lighter than that of the background color. One example of reverse text is a blue background with white text font color. For normal text, the image values below the block binarization threshold, th, belong to the text class, while for reverse text, the image values above the block binarization threshold, th, belong to the text class.

In some embodiments of the present invention, the text type for a block may be determined by comparing the percentage of elements above the block binarization threshold to a predetermined threshold. In some embodiments of the present invention, the percentage of elements above the block binaralization threshold may be related to the percentage of bright elements in the block. In some embodiments of the present invention, the text type of a block may be determined according to:

$$\text{block}(i, j) \cdot \text{text\_type} = \begin{cases} \text{normal,} & (\text{block}(i, j) \cdot \text{no} \geq \text{thresh\_light}) \\ \text{reverse,} & \text{otherwise,} \end{cases}$$

where normal and reverse may be represented by binary values and thresh_light is a predetermined threshold. In some embodiments of the present invention, the value of thresh_light be such that the classification may be biased toward normal text. An exemplary value of thresh_light which biases the classification toward normal text is 0.45.

In alternative embodiments of the present invention, the text type of a block may be determined according to:

$$block(i, j) \cdot \text{text\_type} = \begin{cases} \text{normal}, & (block(i, j) \cdot \text{no} > \text{thresh\_light}) \\ \text{reverse}, & \text{otherwise}, \end{cases}$$

where normal and reverse may be represented by binary values and thresh_light is a predetermined threshold. In some embodiments of the present invention, the value of thresh_light be such that the classification may be biased toward normal text. An exemplary value of thresh_light which biases the classification toward normal text is 0.45.

In alternative embodiments of the present invention, the text type for a plurality of substantially proximate blocks may be determined by comparing, for the plurality of blocks, the percentage of elements above their respective block's binarization threshold to a predetermined threshold. In some embodiments of the present invention, the text type of a block within a region of blocks denoted R may be determined according to:

$$block(i, j) \cdot \text{text\_type} = \begin{cases} \text{normal}, & \left( \dfrac{\sum_{block(i,j) \subset R} block(i, j) \cdot \text{no}}{B} \geq \text{thresh\_light} \right) \\ \text{reverse}, & \text{otherwise}, \end{cases}$$

where normal and reverse may be represented by binary values, thresh_light is a predetermined threshold and B is the number of blocks in R. In some embodiments of the present invention, the value of thresh_light be such that the classification may be biased toward normal text. An exemplary value of thresh_light which biases the classification toward normal text is 0.45. If the blocks are not of equal sizes, then the summation may be weighted according to their relative sizes.

In alternative embodiments of the present invention, the text type of a block within a region of blocks denoted R may be determined according to:

$$block(i, j) \cdot \text{text\_type} = \begin{cases} \text{normal}, & \left( \dfrac{\sum_{block(i,j) \subset R} block(i, j) \cdot \text{no}}{B} > \text{thresh\_light} \right) \\ \text{reverse}, & \text{otherwise}, \end{cases}$$

where normal and reverse may be represented by binary values, thresh_light is a predetermined threshold and B is the number of blocks in R. In some embodiments of the present invention, the value of thresh_light be such that the classification may be biased toward normal text. An exemplary value of thresh_light which biases the classification toward normal text is 0.45. If the blocks are not of equal sizes, then the summation may be weighted according to their relative sizes.

In alternative embodiments of the present invention, statistical classification may be used to determine text type. In some of these embodiments, the probability of text being normal text versus reverse text conditioned on the percentage elements above threshold may be quantified.

In some embodiments of the present invention, the percentage of text blocks that are reverse text blocks may be calculated. The reverse text block percentage may be compared to a predetermined threshold to reject reverse text classification if the likelihood of reverse text is small when compared to the risk of misclassification.

In some embodiments of the present invention, binarization of a text block may be performed according to:
If block (i, j).text_type=normal then $$block(i, j) \cdot \text{element}(m, n) = \begin{cases} \text{foreground}, & block(i, j) \cdot \text{image\_value}(m, n) \leq block(i, j) \cdot th \\ \text{background}, & block(i, j) \cdot \text{image\_value}(m, n) > block(i, j) \cdot th, \end{cases}$$

and
If block (i, j).text_type=reverse then $$block(i, j) \cdot \text{element}(m, n) = \begin{cases} \text{foreground}, & block(i, j) \cdot \text{image\_value}(m, n) > block(i, j) \cdot th \\ \text{background}, & block(i, j) \cdot \text{image\_value}(m, n) \leq block(i, j) \cdot th. \end{cases}$$

If a block is not a text block, then the elements in the block may be assigned to the background class.

In alternative embodiments of the present invention, binarization of a text block may be performed according to:
If block (i, j).text_type=normal then $$block(i, j) \cdot \text{element}(m, n) = \begin{cases} \text{foreground}, & block(i, j) \cdot \text{image\_value}(m, n) < block(i, j) \cdot th \\ \text{background}, & block(i, j) \cdot \text{image\_value}(m, n) \geq block(i, j) \cdot th, \end{cases}$$

and
If block (i, j).text_type=reverse then $$block(i, j) \cdot \text{element}(m, n) = \begin{cases} \text{foreground}, & block(i, j) \cdot \text{image\_value}(m, n) \geq block(i, j) \cdot th \\ \text{background}, & block(i, j) \cdot \text{image\_value}(m, n) < block(i, j) \cdot th. \end{cases}$$

If a block is not a text block, then the elements in the block may be assigned to the background class.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for locating text in a digital image, said method comprising:
   a) dividing a digital image into a plurality of blocks;
   b) determining a first contrast measure associated with a first block in said plurality of blocks;
   c) determining a first bimodality measure associated with said first block;
   d) classifying said first block as a text block when said first contrast measure and said first bimodality measure meet a first criterion; and e) classifying said first block as a non-text block when said first contrast measure and said first bimodality measure do not meet said first criterion.

2. A method as described in claim 1 further comprising, when said first block is classified as a text block, determining a text type associated with said first block.

3. A method as described in claim 2, wherein said text type is a type selected from the group consisting of normal text and reverse text.

4. A method as described in claim 2 further comprising:
   a) wherein said first block comprises a first plurality of image values associated with a first plurality of pixels; forming a first histogram of said first plurality of image values;
   b) determining a first threshold associated with said first histogram, wherein said first threshold separates said first plurality of image values into a first cluster and a second cluster;
   c) determining a first percentage of said first plurality of pixels, wherein said first percentage corresponds to the number of pixels of said first plurality of pixels with an image value above said first threshold; and
   d) determining said text type associated with said first block using said first percentage.

5. A method as described in claim 4, wherein said first threshold maximizes the separation between said first cluster and said second cluster.

6. A method as described in claim 1 further comprising:
   a) determining a second contrast measure associated with a second block in said plurality of blocks;
   b) determining a second bimodality measure associated with said second block;
   c) calculating a contrast threshold associated with said first contrast measure and said second contrast measure;
   d) calculating a bimodality threshold associated with said first bimodality measure and said second bimodality measure; and
   e) wherein said first criterion is based on said contrast threshold and said bimodality threshold.

7. A method as described in claim 1 further comprising:
   a) determining a contrast measure associated with each block in said plurality of blocks, thereby producing a plurality of contrast measures;
   b) determining a bimodality measure associated with each block in said plurality of blocks, thereby producing a plurality of bimodality measures;
   c) calculating a contrast threshold associated with said plurality of contrast measures;
   d) calculating a bimodality threshold associated with said plurality of bimodality measures; and
   e) wherein said first criterion is based on said contrast threshold and said bimodality threshold.

8. A method as described in claim 7, wherein:
   a) said contrast threshold separates said plurality of contrast measures into a first contrast-measure cluster and a second contrast-measure cluster, wherein said contrast threshold maximizes the separation between said first contrast-measure cluster and said second contrast-measure cluster; and
   b) said bimodality threshold separates said plurality of bimodality measures into a first bimodality-measure cluster and a second bimodality-measure cluster, wherein said bimodality threshold maximizes the separation between said first bimodality-measure cluster and said second bimodality-measure cluster.

9. A method as described in claim 7 further comprising:
   a) calculating a bimodal-model-effectiveness measure associated with said plurality of bimodality measures; and
   b) wherein said first criterion comprises a comparison with said contrast threshold when said bimodal-model-effectiveness measure associated with said plurality of bimodality measures meets a bimodality criterion; and
   c) wherein said first criterion comprises a comparison with said contrast threshold and a comparison with said bimodality threshold when said bimodal-model-effectiveness measure associated with said plurality of bimodality measures does not meet said bimodality criterion.

10. A method as described in claim 1, wherein said first block comprises a first plurality of image values; and said method further comprises forming a first histogram of said first plurality of image values.

11. A method as described in claim 10, wherein determining said first bimodality measure comprises:
    a) determining a first threshold associated with said first histogram, wherein said first threshold separates said first plurality of image values into a first cluster and a second cluster;
    b) calculating a total variance of said first plurality of image values;
    c) calculating a between-class variance between said first cluster and said second cluster; and
    d) calculating the ratio of said between-class variance and said total variance.

12. A method as described in claim 11, wherein said first threshold maximizes the separation between said first cluster and said second cluster.

13. A method as described in claim 11 further comprising producing a binary representation of said first block, wherein said binary representation comprises:
    a) a first label associated with pixel locations in said first block with image values on one side of said first threshold; and
    b) a second label associated with pixel locations in said first block with image values on the other side of said first threshold.

14. A method as described in claim 13, wherein:
    a) said first label indicates text; and
    b) said second label indicates non-text.

15. A method locating text in a digital image, said method comprising:
    a) dividing a digital image comprising a plurality of pixels and associated images values into a plurality of blocks;
    b) determining an image-value threshold associated with each block in said plurality of blocks, thereby producing a plurality of image-value thresholds;
    c) determining a contrast measure associated with each block in said plurality of blocks, thereby producing a plurality of contrast measures;
    d) determining a contrast threshold associated with said plurality of contrast measures;
    e) determining a bimodality measure associated with each block in said plurality of blocks, thereby producing a plurality of bimodality measures;
    f) determining a bimodality threshold associated with said plurality of bimodality measures;
    g) determining a bimodal-model-effectiveness parameter associated with said plurality of bimodality measures;
    h) determining an above-threshold measure associated with each block, thereby producing a plurality of above-threshold measures, wherein said above-threshold measure associated with a block is related to the number of pixels in said block with an image value above said image-value threshold associated with said block; and i) classifying a first block in said plurality of blocks according to said contrast measure associated with said first block when said bimodal-model-effectiveness parameter meets a first criterion; and j) classifying said first block in said plurality of blocks according to said contrast measure associated with said first block and said bimodality measure associated with said first block when said bimodal-model-effectiveness parameter associated with said plurality of bimodality measures does not meet said first criterion.

16. A method as described in claim 15, wherein said classifying said first block in said plurality of blocks according to said contrast measure associated with said first block when said bimodal-model-effectiveness parameter meets a first criterion comprises:

a) classifying said first block as a text block when said contrast measure associated with said first block meets a second criterion in relation to said contrast threshold; and b) classifying said first block as a non-text block when said contrast measure associated with said first block does not meet said second criterion in relation to said contrast threshold.

17. A method as described in claim 16 further comprising, when said first block is classified as a text block, determining a text type associated with said block.

18. A method as described in claim 15, wherein said classifying said first block in said plurality of blocks according to said contrast measure associated with said first block and said bimodality measure associated with said first block when said bimodal-model-effectiveness parameter associated with said plurality of bimodality measures does not meet said first criterion comprises:

a) classifying said first block as a text block when said contrast measure associated with said first block meets a second criterion in relation to said contrast threshold and said bimodality measure associated with said first block meets a third criterion in relation to said bimodality threshold; and b) classifying said first block as a non-text block when said contrast measure associated with said first block does not meet a second criterion in relation to said contrast threshold or said bimodality measure associated with said first block does not meet a third criterion in relation to said bimodality threshold.

19. A method as described in claim 18 further comprising, when said first block is classified as a text block, determining a text type associated with said block.

20. A method as described in claim 15 further comprising binarizing said first block according to said image-value threshold associated with said first block.

* * * * *